United States Patent Office 3,142,582
Patented July 28, 1964

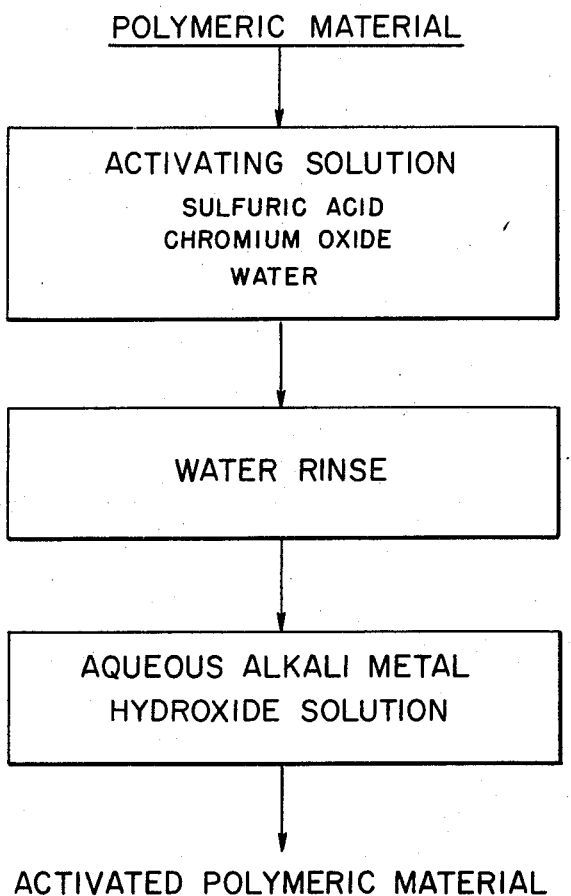

3,142,582
METHOD OF TREATING POLYESTER POLYMER MATERIALS TO IMPROVE THEIR ADHESION CHARACTERISTICS
Herman Koretzky and Bernard Leland, both of Poughkeepsie, N.Y., assignors to International Business Machines Corporation, New York, N.Y., a corporation of New York
Filed Nov. 17, 1961, Ser. No. 153,187
4 Claims. (Cl. 117—47)

This invention relates to the surface treatment of polyester polymer products and to the products resulting from such treatment. More particularly, this invention concerns the activation of adhesion properties on a surface of a polyester polymer product to provide the product with a receptivity toward metal and other coating compositions.

In the data processing and computer fields, extensive use is being made of record carriers, such as tapes, discs and cards, which are formed by depositing magnetic recording layers upon polyester polymer bases. One type of polyester that is especially preferred as a base material is poly (ethylene terephthalate) which is sold under the trademark "Mylar." In many applications a nonmetallic recording layer is placed upon such a base. In an increasingly large number of cases, however, it is desired that the recording layer be a ferromagnetic metal or alloy. Difficulties have been encountered heretofore in attempting to deposit a layer of metal or metal ions upon a polyester polymer base in that this kind of material, like many other plastics, is not normally receptive to the aqueous solutions employed in metal plating processes, and prior efforts to overcome this deficiency have not been particularly successful. Moreover, the adhesion properties at the surface of such a material normally are low. Hence, the kind of plating which has been effected upon polyester polymer bases in the past has been characterized by undesirable void spots or by spots of low adhesion from which the metal is apt to be stripped or flaked during normal usage of the product. This makes it highly desirable that some way be found to activate the polyester polymer so as to increase its adhesion properties at its surface and render the surface hydrophilic while, at the same time, retaining the normal strength and other desirable physical properties of the material.

In the present state of the art, various methods are available for activating the surface of a polymer or plastic material. However, the prior art methods are not satisfactory for activating adhesion properties on the surface of a polyester polymer material. For example, polyethylene (which is not a polyester polymer and has a chemical structure different from poly (ethylene terephthalate)) is activated by oxidizing the surface of the product with a strong sulfuric acid/dichromate solution. The oxidizing treatment produces a hydrophilic surface on the polyethylene which is adaptable to cementing, printing and metallizing. The solution for treating polyethylene is made by saturating concentrated sulfuric acid with sodium dichromate, the polyethylene being passed through this oxidizing bath, washed in water and dried. Although this particular solution works well with polyethylene, if it were applied to poly (ethylene terephthalate), which reacts differently, it would render the material unusable by severely weakening it or destroying it altogether.

A process for activating the adhesion properties on the surface of a polyester polymer product, is disclosed in a copending application of Bernard Leland, Serial No. 138,609, filed September 18, 1961. In that process a solution of rather critical strength containing sodium dichromate and sulfuric acid is used to treat a polyester polymer product. The treatment causes surface hydrolysis of the polyester polymer, thereby improving its wetting characteristics and producing a surface with highly reactive polar sites at which bonding of the polymer to metal or metal ions can readily occur. This process is effective on polyester polymer products having surfaces of uniform quality. However, as the result of a fault in its manufacturing process the polyester polymer may contain gel areas, i.e., areas where the molecular weight of the polymer is greatly in excess of the normal molecular weight. In order to make these fault areas hydrophilic a more drastic surface treatment is required than is necessary for the normal surface. The more drastic treatment, while making the gel areas sufficiently hydrophilic to insure surface coverage by the plating material, attacks the areas of normal polymer to such a degree that the average adhesion value therein falls to an unacceptably low level. Conversely, a more gentle treatment leads to considerably higher adhesion values but with many void and blister areas.

Accordingly, it is an object of this invention to impart altered surface properties to a polyester polymer product so as to make the product receptive to metal and metal ions.

The drawing is a flow chart of the process of the invention.

Other objects include:
Providing an improved method for activating adhesion properties on the surface of a polyester polymer product without unduly reducing the desirable physical properties of the material;
Providing an improved polyester polymer product with a hydrophilic, highly polar surface compound;
Providing an economical and efficient process for activating a polyester polymer material in the manner indicated above;
Providing a method which operates to activate the adhesion properties on the surface of a polyester polymer product notwithstanding variations in the surface due to different molecular weights of the polymer.

Briefly, in accordance with the invention, adhesion properties are provided on the surface of a polyester polymer product, such as poly (ethylene terephthalate), by exposing the surface first to acid solution and second to an alkaline solution. The acid solution contains 0.31 to 0.57 mol percent sodium dichromate (anhydrous), 33.4 to 53.8 mol percent sulfuric acid (anhydrous) and the balance water; the alkaline solution is a sodium hydroxide solution containing at least 2.49 moles per liter of sodium hydroxide. The duration of the treatment depends upon the concentration and temperature of each of the solutions. Exposure to the acid solution causes surface hydrolysis of the polyester polymer; thereby, improving its wetting characteristics and producing a surface with highly reactive polar sites for the polymer of high molecular weight, at which bonding of metal and metal ions can readily occur, while producing an over hydrolyzed surface layer where molecular weight is normal. Contacting the acid treated surface with the sodium hydroxide solution effectuates the removal of the over treated layer, the sodium hydroxide removing the relatively short chains of hydrolyzed material. The normal surface properties of the polyester polymer product are thereby altered to provide a hydrophilic, polar surface which is receptive to the aqueous solutions used in metal plating processes and which is readily bondable to metal plating. This is achieved without unduly weakening or otherwise adversely affecting the physical characteristics of the polyester polymer product.

The foregoing and other objects, features and advantages of the invention will be apparent from the following more particular description of preferred embodiments of the invention.

More particularly, in accordance with the invention, the surface of a polyester polymer product, such as poly (ethylene terephthalate), is altered so that a coating placed thereon in accordance with standard procedures has a high adhesion strength which may be on the order of 1000 grams per inch, as measured by a 180°-peel-back-adhesion test. The high adhesion is obtained by hydrolyzing the surface of the polyester polymer product by immersing it for a period of at least 5 seconds in an acid solution comprising 0.31 to 0.57 mol percent sodium dichromate (anhydrous), 33.4 to 53.8 mol percent sulfuric acid (anhydrous) and the balance water, the solution being maintained at a temperature between 80 to 95° C.

When the above treatment is applied, for example, to poly (ethylene terephthalate) represented by the structural formula:

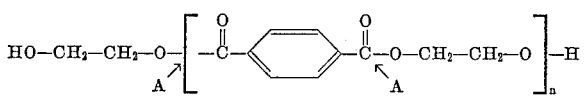

where $n$ is an integer from 100 to 150, the surface is hydrolyzed by breaking of bonds at sites (A) resulting in carboxyl and hydroxyl groups. The reaction is essentially the reverse of the esterification reaction by which the polymer is originally formed and produces a highly polar surface. The formation of these groups on the surface increases the ability of the surface to be wetted by water and provides reactive sites on the surface of the material.

After suitable rinsing, the acid treated surface is immersed for a period of at least 5 seconds in a sodium hydroxide solution having a concentration of at least 2.49 moles per liter and having a temperature in the range between 70 to 100° C. The sodium hydroxide removes any short chain small portions of depolymerized ethylene terephthalate left on the surface. These short chain portions are produced in greater numbers as the acid treatment becomes more drastic. The sodium hydroxide attacks these short chain portions leaving the resultant hydroxyl and carboxyl groups with sodium replacing hydrogen, thus increasing hydrophilic nature of the surface.

Typical examples of the solutions used in the invention, selected for purposes of illustration, are given in Table I.

Table I

| Treatment | Sodium Dichromate, Mole Percent | Sulfuric Acid, Mole Percent | Sodium Hydroxide, Moles/liter |
|---|---|---|---|
| a | 0.38 | 46.1 | 2.49 |
| b | 0.38 | 46.1 | 3.74 |
| c | 0.38 | 46.1 | 7.48 |
| d | 0.31 | 37.6 | 3.74 |
| e | 0.35 | 48.5 | 3.74 |
| f | 0.37 | 54.1 | 3.74 |
| g | 0.39 | 48.3 | 3.74 |
| h | 0.42 | 54.1 | 3.74 |
| i | 0.46 | 53.9 | 3.74 |
| j | 0.57 | 53.8 | 3.74 |
| k | 0.38 | 45.7 | 3.74 |
| l | 0.46 | 54.3 | 3.74 |
| m | 0.32 | 33.4 | 3.74 |

For example, to activate the surface of a poly (ethylene terephthalate) sheet in accordance with a preferred embodiment of the invention, reference may be had to treatment "b" in Table I. The sheet is first immersed for a period of at least 5 seconds in an acid solution containing 0.38 mol percent sodium dichromate, 46.1 mol percent sulfuric acid and the balance water. The solution is maintained at a temperature between 85 to 95° C. and is made by dissolving 38 grams $Na_2Cr_2O_7 \cdot 2H_2O$ in a solution containing 740 milliliters sulfuric acid (66° Bé) and 249 milliliters water. The sheet is then rinsed and subsequently immersed for another period of at least 5 seconds in a sodium hydroxide solution having a concentration of 3.74 moles per liter (150 grams/liter), the solution being maintained at a temperature between 95 to 100° C. The sheet is then rinsed and has a receptivity for aqueous sensitizing solutions, such as stannous chloride and palladium chloride solutions. A nickel layer plated on the surface by conventional electroless techniques has an adhesion strength in the order of 2100 grams per inch.

In order to provide such adhesion values, it is necessary to carefully control the parameters of time, temperature and concentration so as to regulate the degree of reaction. If the surface is insufficiently reacted, wetting may take place but adhesion of the metal is poor. Over reacting the surface promotes roughening and deterioration of the physical properties of the polymer product. To avoid these difficulties the acid and alkaline solution treatment temperatures are maintained within prescribed limits; the temperature for the acid treatment lies between 70 to 95° C. and for the sodium hydroxide treatment 80 to 100° C. Each of these has both a high and low temperature range such as:

° C.
(1) High temperature acid treatment_____ 85 to 95
(2) Low temperature acid treatment_____ 70 to 75
(3) High temperature sodium hydroxide treatment _____ 95 to 100
(4) Low temperature sodium hydroxide treatment _____ 80 to 85

A wide range of adhesion values are obtainable with the various possible combinations of acid and sodium hydroxide treatment temperatures. This is brought out by the data in Table II.

Table II

| Treatment | Sodium Hydroxide, Moles/l. | Temp., Acid | Temp., Sodium Hydroxide | Adhesion, gms./inch |
|---|---|---|---|---|
| a | 2.49 | high | low | 740 |
| a | 2.49 | low | high | 2,000 |
| a | 2.49 | high | high | 2,020 |
| a | 2.49 | low | low | 2,200 |
| b | 3.74 | high | low | 1,860 |
| b | 3.74 | low | high | 2,060 |
| b | 3.74 | high | high | 2,100 |
| b | 3.74 | low | low | 2,140 |
| c | 7.48 | high | low | 2,000 |
| c | 7.48 | high | high | 2,050 |
| c | 7.48 | low | high | 2,120 |
| c | 7.48 | low | low | 2,140 |
| d | 3.74 | high | high | 2,000 |
| i | 3.74 | high | high | 440 |
| k | 3.74 | high | high | 1,900 |
| l | 3.74 | high | high | 440 |

With treatment "a," for example, adhesion values between 740 to 2200 grams per inch are obtainable. If the acid temperature is high and the sodium hydroxide temperature low, the adhesion strength is about 740 grams per inch; if the acid temperature is low and the sodium hydroxide temperature high, the adhesion strength is about 2000 grams per inch; and, if both the acid and sodium hydroxide temperature are low, the adhesion strength is about 2200 grams per inch.

Table II also shows the effect of solution concentration on the adhesion values. The data in the table may be summarized as follows:

(1) If a high acid temperature is used, a high sodium hydroxide temperature should be used or a low sodium hydroxide temperature at a high solution concentration;

(2) High sodium hydroxide temperatures produce higher adhesion values;

(3) Low acid temperatures produce higher adhesion values—but voids, pin holes and blisters result.

Accordingly, the optimum conditions for activating the surface of a polyester polymer product are obtained with the combination of a high acid temperature treatment, a high sodium hydroxide temperature treatment, and the solution composition exemplified by treatment "b." Similarly, adhesion values in the required order of magnitude are obtained by immersing a polyester product in an acid solution containing between 0.31 to 0.57 mol percent sodium dichromate, 33.4 to 53.8 mol percent sulfuric acid and the balance water; thereafter, further contacting the surface with a sodium hydroxide solution having a concentration of at least 2.49 moles per liter. Neither the acid solution nor the sodium hydroxide solution taken individually is effective in treating a surface having gel areas whereas the combination of solutions used in accordance with the invention produces results heretofore unobtainable in the art.

In accordance with the invention, polyester polymer surfaces are provided which are readily plated with thin films of copper, tin, nickel, silver or the like by conventional techniques. The invention is not necessarily limited to the metal plating applications herein described, however, since it can be utilized also to improve the adhesion between polyester polymer surfaces and certain organic compounds such as the binders employed in magnetic oxide coatings.

While the invention has been particularly described and shown with reference to preferred embodiments thereof, it will be understood by those skilled in the art that various changes in form and details may be made therein without departing from the spirit and scope of the invention.

We claim:

1. In a process for imparting receptivity for metal and metal ions to at least one surface of a poly (ethylene terephthalate) product by the steps of:
    contacting said surface with an acid solution maintained at a temperature in the range between 70° C. to 95° C., said acid solution being formed by reacting from about 0.31 to 0.57 mol percent sodium dichromate, about 33.4 to 53.8 mol percent sulfuric acid and the balance water;
    rinsing said treated surface in water; and,
    contacting said rinsed surface with an aqueous metal hydroxide solution maintained at a temperature of at least 80° C. having a hydroxide concentration of at least 2.49 mols per liter.

2. In a process for imparting receptivity for metal and metal ions to at least one surface of a poly (ethylene terephthalate) product by the steps of:
    contacting said surface with an acid solution maintained at a temperature in the range between 70° C. to 95° C. for a period of at least 5 seconds, said acid solution being formed by reacting from about 0.31 to 0.57 mol percent sodium dichromate, about 33.4 to 53.8 mol percent sulfuric acid and the balance water;
    rinsing said surface in water; and,
    contacting said rinsed surface with an aqueous metal hydroxide solution maintained at a temperature in the range between 70° C. to 100° C. having a hydroxide concentration of at least 2.49 mols per liter.

3. In a process for imparting receptivity for metal and metal ions to at least one surface of a poly (ethylene terephthalate) product by the steps of:
    contacting said surface with an acid solution maintained at a temperature between 85° C. to 95° C. for a period of at least 5 seconds, said acid solution being formed by reacting about 0.38 mol percent sodium dichromate, about 46.1 mol percent sulfuric acid and the balance water;
    rinsing said contacted surface in water; and,
    contacting said rinsed surface with an aqueous metal hydroxide solution maintained at a temperature in the range between 95° C. to 100° C. for a period of at least 5 seconds having a hydroxide concentration of at least 3.74 mols per liter.

4. The reaction product formed by:
    contacting a poly (ethylene terephthalate) product with an acid solution maintained at a temperature in the range between 70° C. and 95° C. for a period of at least 5 seconds, where said acid solution is formed by reacting from about 0.31 to 0.57 mol percent sodium dichromate, about 33.4 to 53.8 mol percent sulfuric acid and the balance water;
    rinsing said contacted surface in water; and,
    contacting said rinsed surface with an aqueous metal hydroxide solution maintained at a temperature in the range between 70° C. to 100° C. for a period of at least 5 seconds having a hydroxide concentration of at least 2.49 mols per liter where said reaction product is characterized by having a receptivity for metal and metal ions with an adhesion strength of at least 1000 grams per inch.

References Cited in the file of this patent

UNITED STATES PATENTS

| | | |
|---|---|---|
| 3,035,915 | Cohen | May 22, 1962 |
| 3,035,916 | Heiart | May 22, 1962 |
| 3,035,941 | Cohen | May 22, 1962 |